(12) United States Patent
John et al.

(10) Patent No.: US 7,204,461 B2
(45) Date of Patent: Apr. 17, 2007

(54) WIRE CLOTH

(75) Inventors: Detlef John, Ahlen (DE); Stefan Butenkemper, Ennigerloh (DE)

(73) Assignee: Haver & Boecker, Oelde (DE)

( * ) Notice: Subject to any disclaimer, the term of this patent is extended or adjusted under 35 U.S.C. 154(b) by 94 days.

(21) Appl. No.: 10/700,012

(22) Filed: Nov. 3, 2003

(65) Prior Publication Data

US 2004/0091685 A1 May 13, 2004

(30) Foreign Application Priority Data

Nov. 9, 2002 (DE) .......................... 202 17 296 U

(51) Int. Cl.
*B21F 29/02* (2006.01)
*B21F 27/10* (2006.01)
*B21F 27/00* (2006.01)
*B21F 27/08* (2006.01)

(52) U.S. Cl. .................. 245/2; 245/1; 245/8; 140/111; 140/112

(58) Field of Classification Search .............. 245/1–11; 140/112, 111
See application file for complete search history.

(56) References Cited

U.S. PATENT DOCUMENTS

| | | | | |
|---|---|---|---|---|
| 3,049,796 A | * | 8/1962 | Pall | 428/596 |
| 3,143,150 A | * | 8/1964 | Buchanan | 139/425 A |
| 3,690,605 A | * | 9/1972 | Pall | 428/605 |
| 3,789,498 A | * | 2/1974 | Cole | 228/118 |
| 4,206,787 A | * | 6/1980 | Strandly | 139/383 A |
| 4,412,859 A | * | 11/1983 | Hatfield et al. | 75/410 |
| 4,691,744 A | * | 9/1987 | Haver et al. | 139/425 R |
| 5,029,779 A | * | 7/1991 | Bruggeman | 245/4 |
| 5,188,813 A | * | 2/1993 | Fairey et al. | 423/403 |
| 6,723,120 B2 | * | 4/2004 | Yan | 623/1.15 |
| 6,889,852 B1 | * | 5/2005 | Loncke et al. | 210/490 |

FOREIGN PATENT DOCUMENTS

| | | |
|---|---|---|
| DE | 11 11 151 B | 7/1961 |
| DE | 25 31 752 A1 | 2/1977 |
| DE | 199 40 792 A1 | 3/2001 |

* cited by examiner

*Primary Examiner*—Robert H Muromoto
(74) *Attorney, Agent, or Firm*—Henry M. Feiereisen

(57) ABSTRACT

A wire cloth includes metallic warp wires and metallic weft wires interwoven with one another, wherein the weft wires have each a diameter which is equal or smaller than a clear distance between two neighboring warp wires, and wherein the weft wires are constricted in crossing regions with the warp wires.

9 Claims, 1 Drawing Sheet

WIRE CLOTH

CROSS-REFERENCES TO RELATED APPLICATIONS

This application claims the priority of German Patent Application, Serial No. 202 17 296.1, filed Nov. 9, 2002, pursuant to 35 U.S.C. 119(a)–(d), the disclosure of which is incorporated herein by reference.

BACKGROUND OF THE INVENTION

The present invention relates to a wire cloth, in particular to a filter cloth, having metallic warp wires and metallic weft wires interwoven with one another.

Wire cloths of a type involved here can also be labeled as fine filter cloths as the diameter of the warp wires and the weft wires is at a maximum from 0.1 to 0.2 mm, and at a minimum between 0.02 and 0.03 mm. The number of warp wires ranges between 180 to 500 warp wires per inch, whereas the number of weft wires ranges between 500 to 5000 wires per inch. So-called filtration triangles are obtained through weaving. Heretofore, the interval between the weft wires is smaller than the filtration triangles. The use of warp wires and weft wires with very small diameters is required to realize fine filtering meshes below 10 μm. The fineness of the filter can hereby be varied by the diameter of the warp wires and weft wires as well as by the number of wires per length unit. Conventional wire cloths have clear distances between the individual warp wires which is greater than the diameter of the interlaced weft wires. The warp wires and weft wires can be woven hereby by the so-called twilled weave such as double twill weave (DTW) or coarse-mesh twill, but also by a plain weave such as single plain weave (SPW) or reverse plain weave.

Wire cloths can be used in a wide variety of applications. However, a problem associated with conventional wire cloths is the need for a great number of weft wires per length unit, so that production costs and material consumption is high. Moreover, the length of the cloth produced per time unit is correspondingly small.

It would therefore be desirable and advantageous to provide an improved wire cloth to obviate prior art shortcomings and to reduce the material consumption while still retaining the fineness of the filter mesh, and to increase the output of a loom per time unit, i.e. to increase the length of a wire cloth woven per time unit.

SUMMARY OF THE INVENTION

According to one aspect of the present invention, a wire cloth includes metallic warp wires and metallic weft wires interwoven with one another, wherein the weft wires have each a diameter which is equal or greater than a clear distance between two neighboring warp wires and wherein the weft wires are constricted in crossing regions with the warp wires.

Suitably, the weft wires have a diameter which at least corresponds to the clear distances between two neighboring warp wires. Their diameter may, however, also be greater, as will be described furtherbelow. To ensure clarity, it is necessary to establish the definition of important terms that will be used throughout this disclosure. The term "clear distance" relates to the free spaces and does not refer to the distance between the longitudinal center axes of two neighboring warp wires. It has been surprisingly found that current weaving technology can be used to guide the weft wires through the interstices, even though they may initially appear to narrow. As the weft wires are constricted in the interstices, the filter fineness is comparable to conventional cloths despite the reduction in the number of weft wires per length unit. As a result, the material consumption is lowered and the output of the loom is increased. The constriction is realized through cold-forming of the respective crossing region. Despite the greater interval between the individual weft wires, the filter fineness is maintained and ranges below 10 μm.

According to another feature of the present invention, the weft wires may be constricted in the crossing regions to or approximately to the clear distance measures between neighboring warp wires. In this way, excessive weakening of the weft wires is avoided.

A wire cloth according to the present invention is especially useful for separation of particles of a gas-solid mixture, whereby the particles to be filtered out are extremely small. Therefore, in accordance with another feature of the present invention, the weft wires have a diameter in the range from $1/100$ mm to $1/10$ mm. Suitably, the weft wires are constricted in the crossing regions with the warp wires at a range of 10% of the original diameter of each weft wire.

A wire cloth according to the present invention, or a product manufactured therefrom, can be subjected to pressure for certain applications. Although the constrictions fix the warp wires and the weft wires relative to one another, it may be suitable for such applications to additionally connect the crossing points between the warp wires and the weft wires with each other. This may be implemented through a heat treatment process, e.g. sintering process.

Suitably, the wire cloth according to the present invention is a twilled cloth so that the diameters of the warp wires are suitably greater than the diameter of the weft wires. According to another feature of the present invention, the diameter of the warp wires may range between 0.03 mm to 0.125 mm, and the diameter of the weft wires may range between 0.02 mm to 0.1 mm. The warp wires may have a mesh count between 180 to 500 wires per inch, whereas the weft wires may have a mesh count between 500 to 5000 wires per inch.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
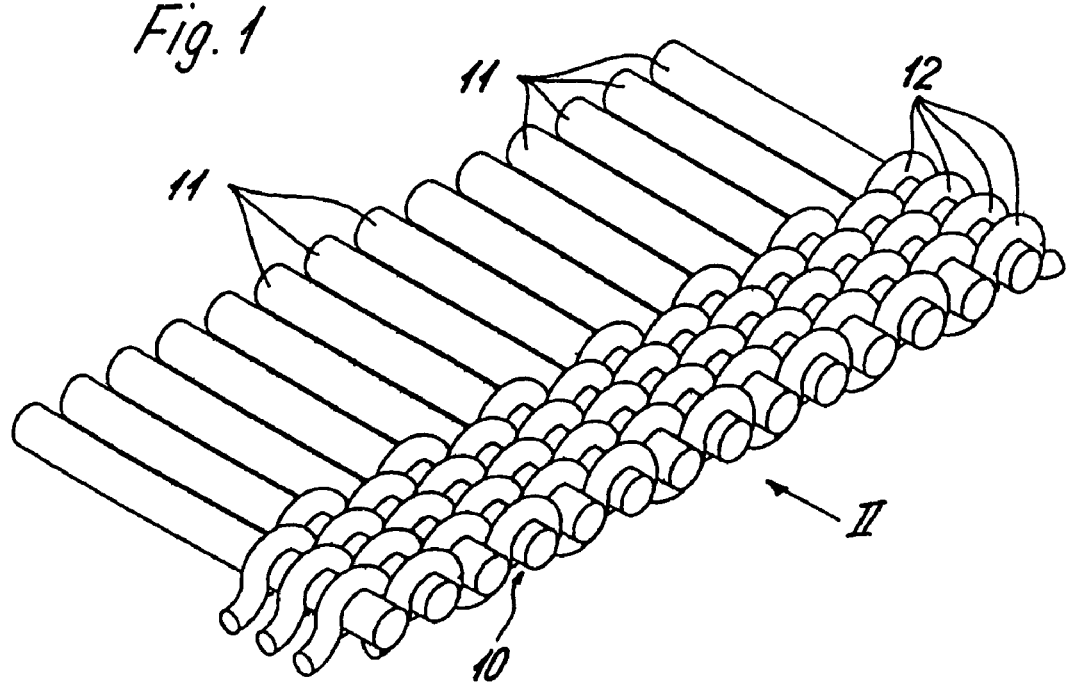
FIG. 1 is a perspective illustration, on an enlarged scale, of a portion of a plain weave according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
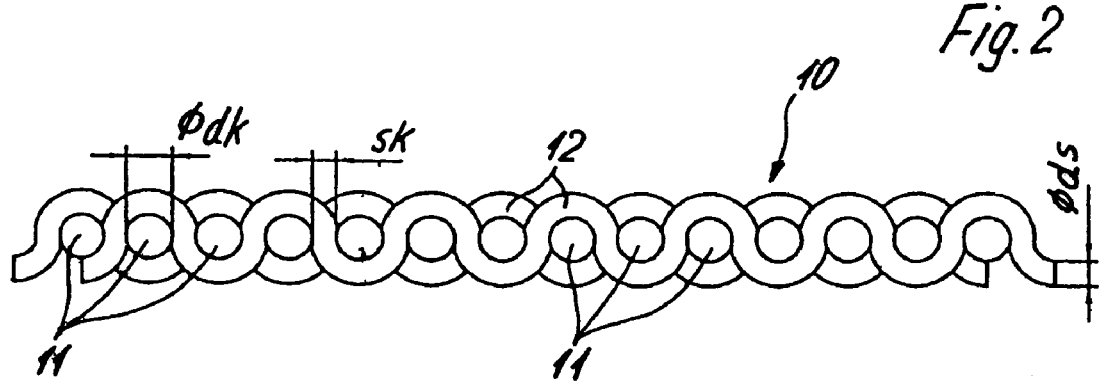
FIG. 2 is an end view of the plain weave of FIG. 1 in the direction of arrow 11.

Turning now to the drawing, and in particular to FIG. 1, there is shown a perspective illustration, on an enlarged, of a portion of a wire cloth according to the present invention, generally designated by reference numeral 10 and woven by a plain weave pattern. The wire cloth portion 10 includes warp wires 11, running in longitudinal direction, and weft wires 12 running crosswise to the cloth 10 as woven. For ease of illustration, the weft wires 12 are not illustrated across the entire length of the warp wires 11. The weave, shown in FIGS. 1 and 2 is a so-called SPW-weave in which the wires are crossing at right angles alternately above and below each other. In other words, the weft wires 12 change the side after each warp wire 11. However, the change in side and two neighboring weft wires 12 are staggered by a warp wire.

As shown in FIG. 2, the warp wires 11 have a diameter dk which is significantly greater than a diameter ds of the weft wires 12. The clear distances between the warp wires 11 are smaller than the diameter of the weft wires 12. Thus, a constriction is realized in the crossing region between the warp wires 11 and the weft wires 12, whereby the constricted region is reduced to a measure sk.

Figure 3:
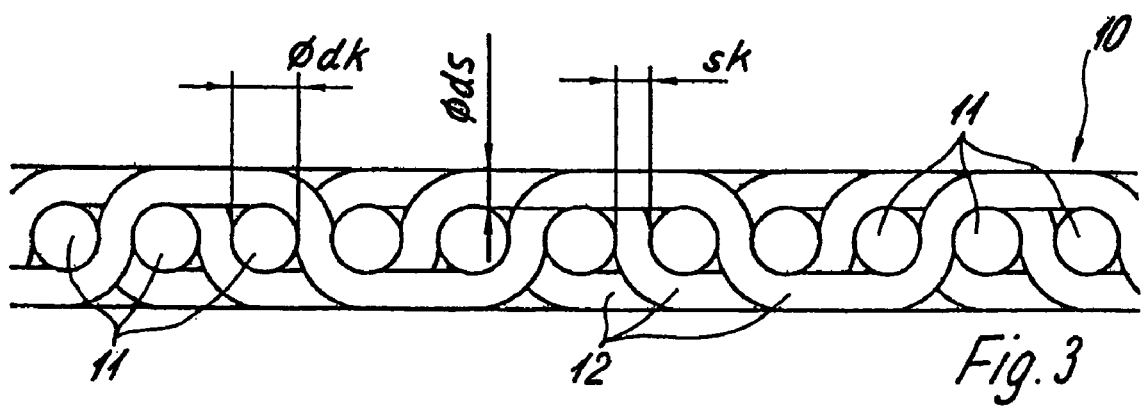
FIG. 3 is an end view of another embodiment of a twilled weave.

FIG. 3 depicts an end view of another embodiment of a twilled weave (DTW weave) in which the diameter of the warp wires 11 is greater than the diameter of the weft wires 12. In this type of weave, the weft wires 12 run alternately over and under two warp wires 11, whereby three neighboring weft wires 12 are respectively staggered by a warp wire 11. Also in this embodiment, the clear distances between the warp wires 11 are slightly smaller than the diameter of the weft wires 12 so that the crossing points are again constricted, as indicated by the measure sk.

Although not shown in detail, the warp wires 11 and the weft wires 12 may further be firmly interconnected at the crossing regions through exposure to a heat treatment, e.g. a sintering process.

It is to be understood that the principles described in the preceding description are applicable to any type of weave. In other words, regardless of the type of weave, the diameter of the weft wires 12 is equal or greater than the clear distances between two neighboring warp wires 11, or vice versa, i.e. the clear distance between two neighboring warp wires 11 is equal or smaller than the diameter of the weft wires 12.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A wire cloth, comprising metallic warp wires and metallic weft wires interwoven with one another, wherein the weft wires have each a diameter which is equal or greater than a shortest distance between two neighboring warp wires, and wherein substantially only the weft wires are plastically deformed in crossing regions with the warp wires, using a cold-forming technique.

2. The wire cloth of claim 1, wherein the weft wires are constricted in the crossing regions to or approximately to a clear distance measure of the warp wires.

3. The wire cloth of claim 1, wherein the weft wires have each a diameter in the range from $\frac{1}{100}$mm to $\frac{1}{10}$mm.

4. The wire cloth of claim 1, wherein the weft wires are constricted in the crossing regions with the warp wires by 10% of their original diameter.

5. The wire cloth of claim 1, wherein the warp wires have a diameter which is greater than a diameter of the weft wires so as to provide a filter cloth.

6. The wire cloth of claim 1, wherein the diameter of the warp wires ranges between 0.03 mm to 0.125 mm.

7. The wire cloth of claim 1, wherein the diameter of the weft wires ranges between 0.02 mm to 0.1 mm.

8. The wire cloth of claim 1, wherein the warp wires have a mesh count between 180 to 500 wires per inch.

9. The wire cloth of claim 1, wherein the weft wires have a mesh count between 500 to 5000 wires per inch.

* * * * *